United States Patent [19]  
Linss et al.

[11] Patent Number: 4,806,093  
[45] Date of Patent: Feb. 21, 1989

[54] APPARATUS COMPRISING A RING-SHAPED NOZZLE, FOR MANUFACTURING A HOLLOW BODY COMPRISED OF PLASTIC MATERIAL

[75] Inventors: Gerhard Linss; Karl F. Ossberger, both of Weissenburg, Fed. Rep. of Germany

[73] Assignee: Ossberger-Turbinenfabrik GmbH & Co., Weissenburg, Fed. Rep. of Germany

[21] Appl. No.: 154,279

[22] Filed: Feb. 10, 1988

[30] Foreign Application Priority Data

Feb. 12, 1987 [DE] Fed. Rep. of Germany ....... 3704266

[51] Int. Cl.⁴ .............................................. B29C 49/04
[52] U.S. Cl. .................................... 425/529; 215/1 C; 264/539; 425/532
[58] Field of Search .................... 428/35, 36; 215/1 C; 425/503, 522, 528, 529, 532, 533, 566, 466; 264/537, 539

[56] References Cited

U.S. PATENT DOCUMENTS 3,029,471 4/1962 Adams et al. .................... 264/539 X  
3,394,209 7/1968 Cheney ........................... 264/539 X  
4,097,214 6/1978 Hsu ..................................... 425/466  
4,118,452 10/1978 Myers et al. .................... 264/539 X  
4,188,179 2/1980 Linss et al. ...................... 264/539 X  
4,305,902 12/1981 Uhlig ............................. 425/532 X

FOREIGN PATENT DOCUMENTS 2528029 1/1977 Fed. Rep. of Germany ...... 264/539

Primary Examiner—Richard L. Chiesa  
Attorney, Agent, or Firm—Holman & Stern

[57] ABSTRACT

In an apparatus comprised of a ring-shaped nozzle in a nozzle piece, which ring-shaped nozzle has a reciprocally movable nozzle cone piece, wherewith the cone piece and nozzle piece together define a ring-shaped nozzle opening, it is desired to modify the ring-shaped nozzle such that, in the manufacturing of hollow bodies, the amount of scrap can be reduced and the range of practicable applications of the apparatus can be extended. This is achieved in that an additional device or arrangement is provided for closing the nozzle opening. With the improved apparatus, one can achieve improvements in the hollow body being produced, the improvements being attributable to a special technique of closing the ring-shaped nozzle, which technique is enabled by the novel closure device.

8 Claims, 4 Drawing Sheets

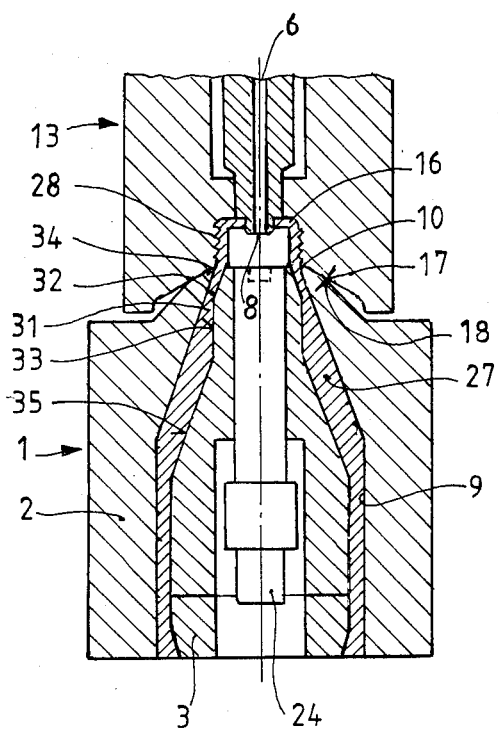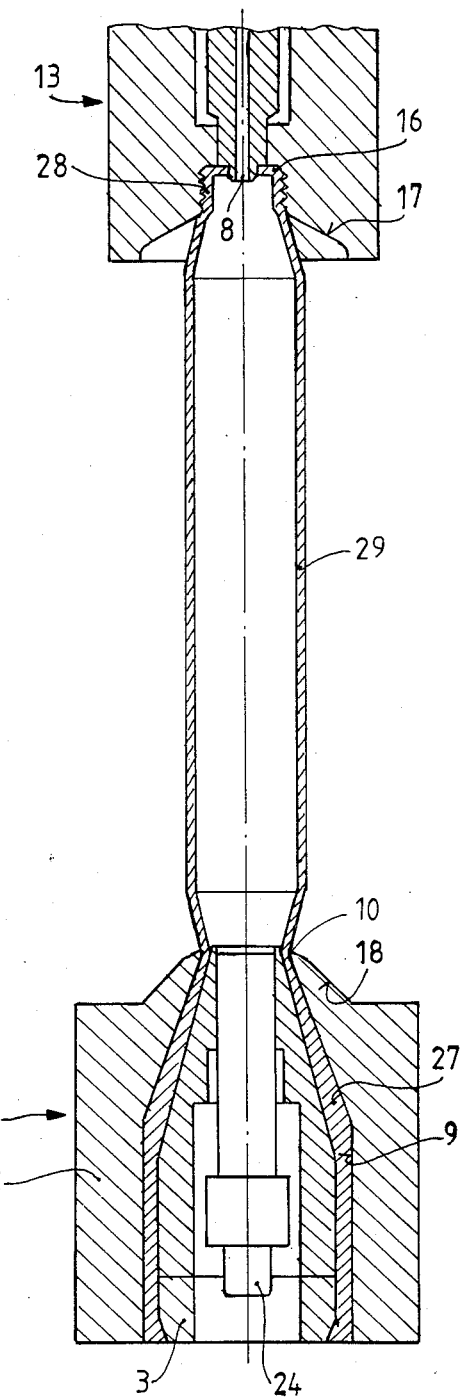

Fig. 5
Fig. 4
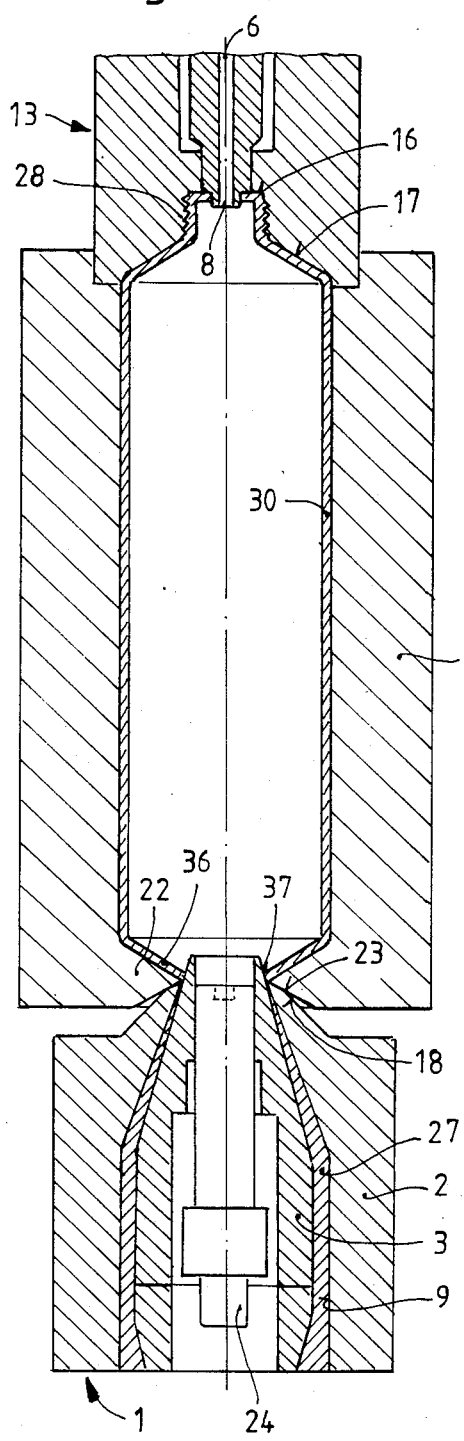
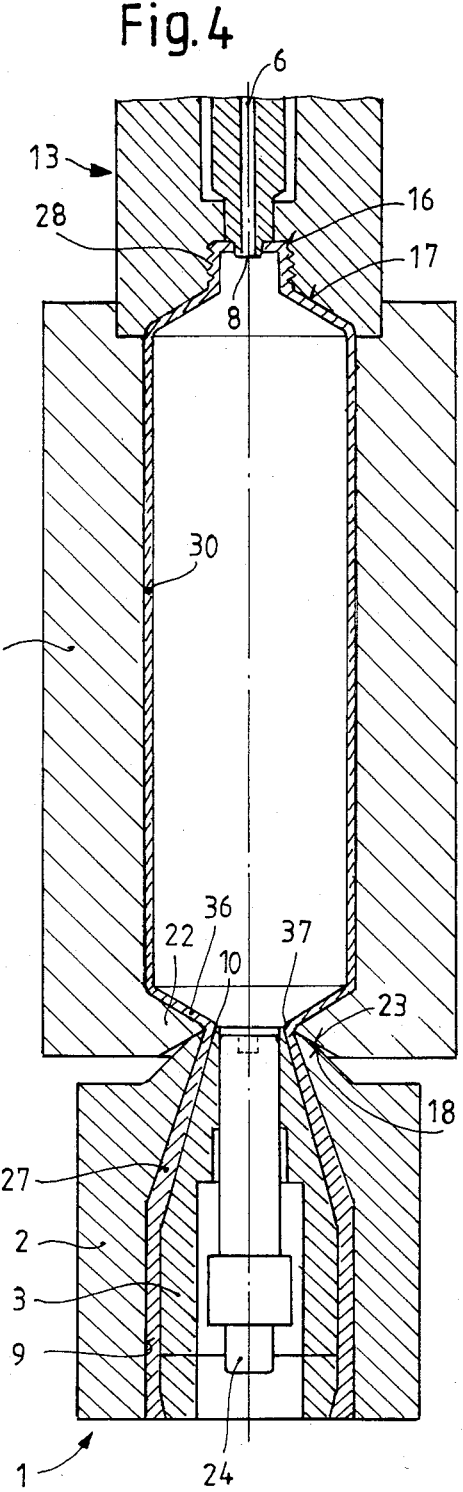

APPARATUS COMPRISING A RING-SHAPED NOZZLE, FOR MANUFACTURING A HOLLOW BODY COMPRISED OF PLASTIC MATERIAL

SUMMARY OF THE INVENTION

The invention relates to an apparatus for manufacturing a hollow body comprised of thermoplastic material. The hollow body is comprised of a head piece produced by injection molding, and a body member produced by blowing e.g., blow-molding or inflating a tube segment attached to and integral with the head piece. The apparatus comprises a ring-shaped nozzle in a nozzle piece, which nozzle has a reciprocally movable nozzle cone piece, wherewith the cone piece and nozzle piece together define a ring-shaped nozzle opening; and said apparatus further comprises a withdrawal device operative with respect to the ring-shaped nozzle, which withdrawal device is axially reciprocally movable and has a recess for the head piece; further comprises a blow mold with a plurality of parts which are laterally reciprocally movable; and comprises a blowing device which blows the extended tube segment against the closed blow mold.

In a known apparatus of the type described (Ger. Pat. No. 2,528,029), the ring-shaped opening of the ring-shaped nozzle has an acute configuration in cross section in the injection direction, wherewith the nozzle piece and cone piece press together along a line, in the closed position. Also, when the nozzle opening is closed the extended tube segment on the end adjacent the nozzle is squeezed and severed, or nearly severed, so that the end of the tube segment is not held in place, or is minimally held. In either case, the result is a substantial amount of scrap, and limited applicability of the apparatus.

Accordingly, it is an object of the invention to devise an apparatus of the type described initially supra, whereby, by modifications in the ring-shaped nozzle, the amount of scrap can be reduced and the range of practicable applications of the apparatus can be extended.

This object is achieved according to the invention in that the apparatus is provided with an additional device for closing the nozzle opening.

The inventive apparatus affords improvements in the hollow body being produced, by way of enabling modifications relating to the closing process of the ring-shaped nozzle. The additional device provided for closing the nozzle opening allows the tube segment being produced, and the body thereof being expanded by blowing [e.g., blow molding], to be improved such that:

Wastage due to (design-related) problems with the nozzle is greatly reduced; and The range of practicable applications is expanded, as a result of improved performance of the ring-shaped nozzle.

A second object of the invention is to devise an apparatus of the type described initially supra, wherein the nozzle piece and cone piece cannot be pressed against each other when in the closed position.

This object is achieved according to the invention in that the region of the cone piece which interacts with the closing edge of the nozzle piece when the cone piece is forwardly advanced (i.e. is within a specified range of forwardly advanced positions) is a cylindrical segment.

When the ring-shaped nozzle is closed, the cylindrical region of the cone piece fits exactly in the closing edge of the nozzle piece without pressing against said closing edge. By avoiding such pressure, one avoids deposits of plastic on the nozzle piece and/or cone piece, which deposits lead to circumferential inserts also means "depressions" in the tube segment being withdrawn, which inserts and/or depressions reduce the quality of the hollow body being manufactured. When the cylindrical region is pushed into the [sic] closing edge, said cylindrical region has a stripping and cleaning action. This obviates the need to remove deposits by the state of the art technique of replacement of the nozzle piece and cone piece.

The nozzle piece and cone piece are still replaceable, to allow for situations of wearout or changing of the nozzle opening. In the case of the stae of the art apparatus, if the the nozzle piece and cone piece are not mounted sufficiently accurately, the [sic] linear contact presents a hazard of either breakage of the nozzle or existence of a residual gap when the nozzle parts are in the closed position. This disadvantageous situation is eliminated by the cylindrical segment on the inventive cone piece, which allows a certain play in positioning the closing cone piece, namely wherewith there is a range of forward advances which the cone piece may undergo and still achieve an accurate closure of the nozzle.

The closure of the nozzle opening achieved by the fit of the cylindrical segment into the closing edge is tight enough, because it need not withstand the full pressure of the plastic feed means but only the "loading pressure", which is the pressure at which plastic is charged into the press device (e.g., a reciprocating piston) for an extrusion stroke. The inventive apparatus is controlled such that the nozzle opening is not closed as long as the extrusion pressure is operative.

It is particularly advantageous if there is a conical segment of the cone piece, disposed forwardly of and merging with the cylindrical segment, wherewith said forward conical segment is parallel to the segment of the nozzle piece which runs laterally of it (wherewith the said conical segment and the also conical segment of the nozzle piece are at the same angle of inclination i.e., cone angle). Thus in the terminal stretch of the nozzle, when the nozzle opening is open, the plastic passes through a channel.

It is further particularly advantageous if the length of the cylindrical segment is approximately equal to the length of the excursion of the cone piece between the open position and closed position. This length (of the cylindrical segment) is sufficient in order to avoid the effects of any play due to assembly factors, and to achieve the desired cleaning action.

It is also particularly advantageous if a device for advancing the plastic is provided which has a screw charging means as well as a compressing piston. This type of device, which is per se known for producing loading pressure as well as extrusion pressure (which pressures are different), is well suited for the nozzle opening is closed via a fit of the cylindrical segment.

A third object of the invention is to devise an apparatus of the type described initially supra, wherein after the tube segment has been formed with the aid of a closed blow mold, said tube segment is held fixed in improved fashion in the region of the ring-shaped nozzle.

This object is achieved according to the invention, in that the closed mold leaves the nozzle opening free; further in that control means are provided for the stretching of the extruded tube segment by means of the retreating withdrawal device under conditions of reduced rate of supply of plastic; and in that the nozzle opening is controlled in the open position up to the start of the blowing process, and after the start of the blowing process is controlled such that said opening is closed by shear action.

In this inventive apparatus the feed of plastic material is interrupted before the withdrawal device has completed its withdrawal stroke, wherewith at least a part of the withdrawal stroke is executed without a corresponding supply of plastic from the nozzle opening, so that the extended tube segment undergoes stretching, with corresponding reduction of the exterior diameter and wall thickness. During this stretching the nozzle opening is open, so that the tube segment is unitary with the plastic material present in the ring-shaped nozzle, and is held by said plastic disposed in the nozzle. This holding action also opposes the elastic contraction force developed in the tube segment as a result of the stretching. Then the blowing is carried out. When the blowing is completed and immediately after the hollow body has been formed and while it is still exposed to the blowing pressure, the tube segment is severed at the nozzle. As long as the hollow body is still hot, there is a contraction force; this force is compensated for by the blowing pressure. The application of the air (blowing) pressure is ended after cooling has occurred (thus after the contraction force has been eliminated).

Because the blow mold may not permissibly interrupt the path to the ring-shaped nozzle, the inventive apparatus may be used only for producing hollow bodies having perforated bottoms. The stretching can be achieved by moving the withdrawal device away from the nozzle faster than would correspond to the rate of throughput of the plastic at the nozzle opening. Squeezing and the associated elliptical cross sectional shape are eliminated, as well as all the associated wall thickness irregularities in the hollow body.

The invention is primarily intended for processing plastics having a relatively high elastic elongation, and high elastic contractile force. Among the plastics which develop high contractile force when stretched in tubular form are, e.g., polyester elastomers and polyurethane elastomers. Also suitable are high molecular weight polyethylene, and thermoplastic rubbers such as Santoprene.

It is particularly advantageous if the closed blow mold is separated from the nozzle opening by at least a small distance. Then the bottoms of the blow-mold pieces cannot press the plastic against the projecting cone piece; accordingly, adhesion of the plastic to the cone piece is avoided.

It is further particularly advantageous if the control means is adjusted for a gradual decrease of the feed of the plastic in relation to the withdrawal speed of the withdrawal device, or for a gradual increase of the withdrawal speed in relation to the feed of the plastic, during the stretching of the tube segment. Thus, the stretching of the tube segment is not uniform during the total period of stretching of said tube segment; nor does the stretching start only near the end of the extending process. Rather, at the beginning of the extending process there is no stretching of the tube segment; and near the end of said process the stretching is increasingly more pronounced. This provides an improved i.e., more uniform distribution of the stretching over the entire length of the tube segment.

It is also particularly advantageous if a valve passing the blowing air and a valve closing off the nozzle opening by shear action (i.e., evidently by approach of surface 33 and edge 34 as per FIG. 2) are actuated simultaneously. Because the closing operation takes time, the nozzle opening is still slightly open when the blowing process is being carried out. If one does not wait for conclusion of the blowing process to actuate the closing operation, one thereby speeds up the operation of the apparatus.

BRIEF DESCRIPTION OF THE DRAWINGS

The drawings illustrate a preferred embodiment of the invention.

FIG. 2 is an enlarged view of the essential part of the apparatus of FIG. 1, but embodying the invention, in a first operating position;

FIG. 3 shows the apparatus of FIG. 2 in a second operating position;

FIG. 4 shows the apparatus of FIG. 2 in a third operating position;

FIG. 5 shows the apparatus of FIG. 2 in a fourth operating position; and

DESCRIPTION OF THE INVENTION

Figure 1:
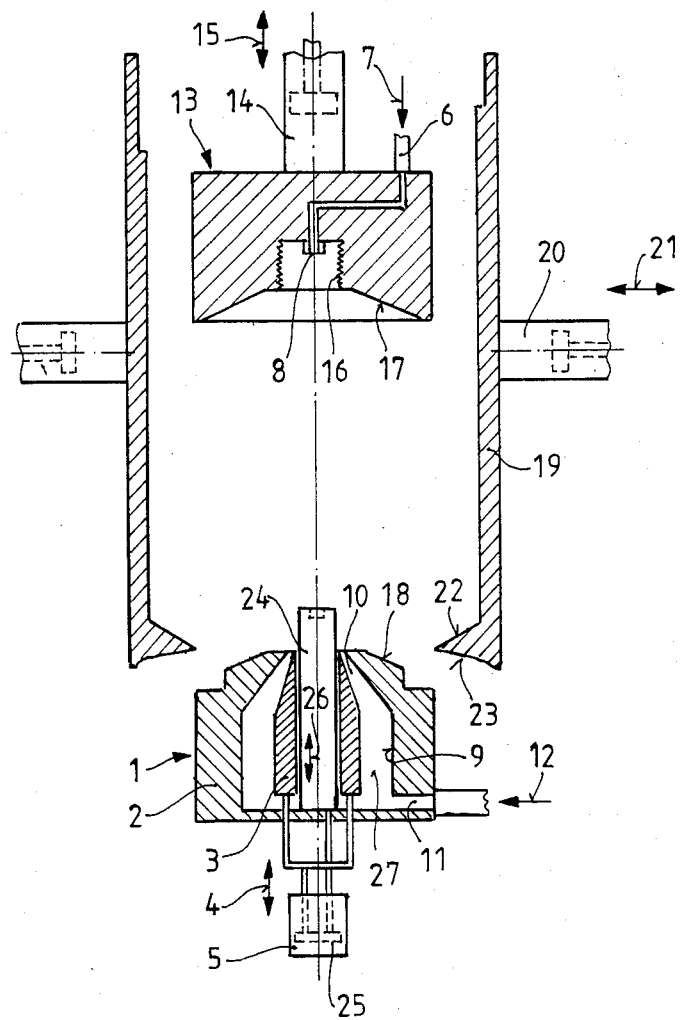
FIG. 1 is a schematic vertical cross section of apparatus comprising a ring-shaped nozzle, for manufacturing a plastic hollow body.

The apparatus according to FIGS. 1-5 is comprised of a ring-shaped nozzle 1 which comprises a fixed nozzle opening piece 2 in which a nozzle cone piece 3 is reciprocally movable (indicated by arrows 4) by means of a piston and cylinder device 5. The nozzle cone piece 3 and nozzle piece 2 delimit between them a ring-shaped channel 9 the forward terminus of which is a ring-shaped nozzle opening 10. Thermoplastic plastic material is fed to channel 9 from the rear, via a pipe 11 (arrow 12). The angle of the cone piece 3 is lower than that of the inner wall of the nozzle piece 2 as the nozzle opening 10 is approached, such that the nozzle opening 10 can be blocked off by advancing the cone piece 3. A mandrel 24 is reciprocally movable in the cone piece 3 (arrows 26), by means of a piston and cylinder device 25. The forward end of the mandrel 24 can be extended out of the cone piece 3, so as to be able to mold a head piece on the hollow body being produced, said molding occurring in a recess 16 (discussed infra).

A withdrawal device 13 is provided above the ring-shaped nozzle 1, which device 13 is reciprocally movable (arrows 15) by a piston and cylinder device 14. The underside of device 13 has a recess 16 with a form-lockingly engaging (e.g., undercut) configuration (not illustrated) whereby the withdrawal device may be separated into a plurality of pieces and reassembled. A support surface 17 on the withdrawal device 13 is radially obliquely inclined, and viewed axially has the shape of a circular ring. An end surface 18 of the nozzle piece 2 matches support surface 17. Compressed air is supplied to the withdrawal device 13 and recess 16 from the rear (arrow 7), via a pipe 6. The air exits the withdrawal device in the recess, via a blow opening 8 centrally disposed therein.

The two blow-mold pieces (19, 19) of a two-piece blow mold are disposed on two opposite sides of the ring-shaped nozzle 1 and withdrawal device 13. The pieces 19 are each reciprocally movable (arrows 21) by a respective piston and cylinder device 20. Each blow-mold piece 19 has a bottom member 22 having an inclined support surface 23 which can rest on the seat surface 18 of the nozzle piece 2.

FIGS. 2-5 illustrate the operation of the apparatus. The withdrawal device 13 initially rests on the ring-shaped nozzle 1 (FIG. 2), wherewith the projecting end member of the mandrel 24 extends into the recess 16. Plastic 27 is then injected through the fully open nozzle opening 10 into the recess 16, whereby a head piece 28 is formed. According to FIG. 2, after the head piece 28 has cooled, the end member of the mandrel 24 is withdrawn from said head piece. This is accomplished by extruding additional plastic out of the partially occluded (i.e., reduced in size by cone piece 3) nozzle opening 10 and moving the withdrawal device 13 away from the ring-shaped nozzle 1. As extrusion occurs from the nozzle, supporting air is blown in via opening 8 while at the same time the plastic compressed in the nozzle is decompressed (as it leaves the nozzle), whereby the diameter of the extruded tube segment 29 is made greater than the diameter of the nozzle opening 10. According to FIG. 4, the blow-mold pieces 19 are closed to form a blow mold, and the tube segment 29 is blown to form a hollow body 30, with the nozzle opening 10 still being open. According to FIG. 5, the nozzle opening 10 has been closed, and the end of the body 30 which end is associated with (is nearest to) the ring-shaped nozzle 1 has been severed from the plastic material 27 in the ring-shaped nozzle.

According to FIG. 2 the ring-shaped space 31 which terminates in the nozzle opening 10 is delimited by the outer surface of the cone piece 3 and the conical inner surface of the nozzle piece 2. As one regards the cone piece 3 from front to rear, its outer surface first forms a segment 32 which is conical and parallel to the inner surface of the nozzle piece 2. The adjoining segment 33 of cone piece 3 is cylindrical, and fits perfectly into the closing edge 34 of the nozzle piece 2 which edge surrounds and forms the limit of the nozzle opening 10. The next adjoining segment 35 is again conical, and again parallel to the conical inner surface of the nozzle piece 2, but runs at a greater distance from said inner surface than does the segment 32.

According to FIGS. 4 and 5 the bottom members 22 of the pushed-together blow-mold pieces 19 terminate outside the nozzle opening 10 and the closing edge 34. Accordingly, the forward end of the cone piece 3 can project lit., "can project completely" between the bottom members 22 (FIG. 5). The body 30 which is produced has a bottom 36 with a central orifice 37.

Figure 6:
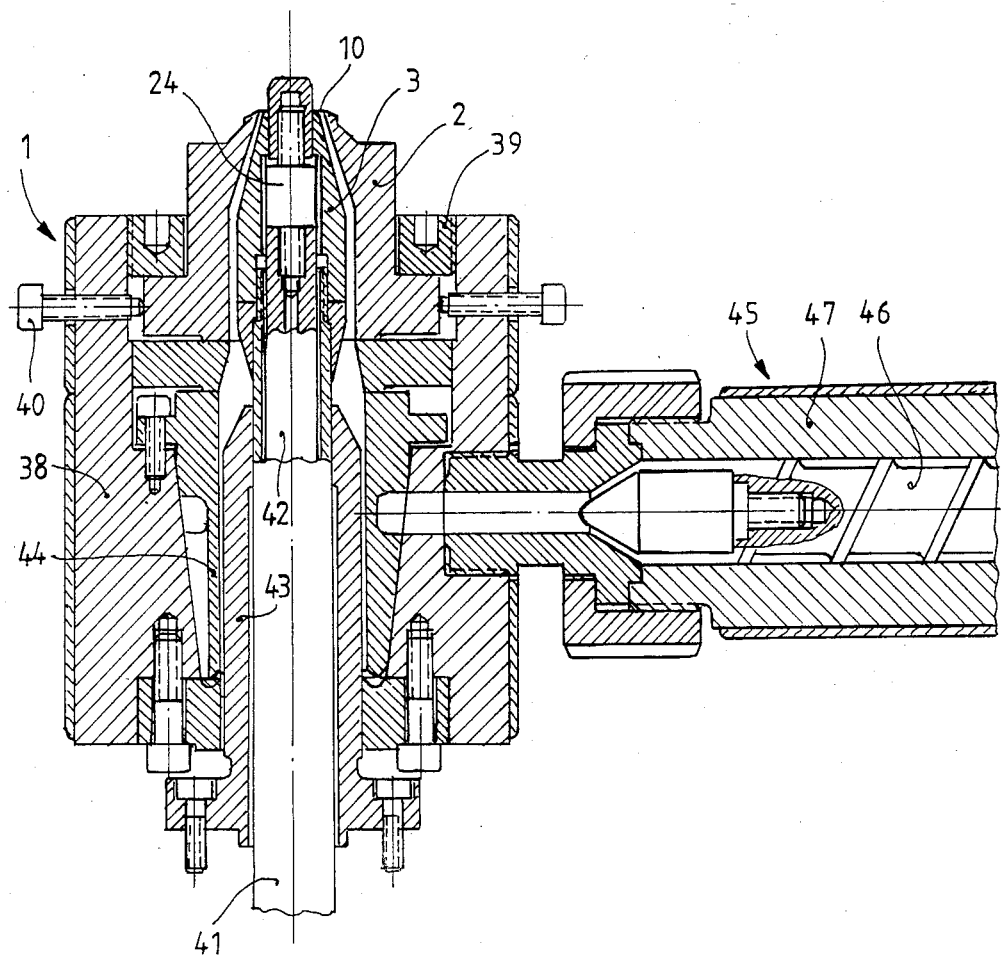
FIG. 6 is a cross sectional view, enlarged with respect to FIG. 1, of means for feeding plastic to the apparatus of FIG. 1.

FIG. 6 illustrates how at the ring-shaped nozzle 1 the nozzle piece 2 is interchangeably mounted in a base piece 38, and is held in place by a threaded ring 39. The position of the nozzle piece 2 is adjustable by centering screws 40. The cone piece 3 may be replaced easily, because it is screwed onto a hollow piston plunger 41 which is associated with the piston and cylinder device 5. The hollow piston plunger 41 accommodates a piston plunger 42 which bears the mandrel 24 and which is associated with the piston and cylinder device 25.

The hollow piston plunger 41 is surrounded by a press plunger 43 which is acted on from the bottom (rear) by a piston and cylinder device (not shown) and is reciprocally movable in a supply head 44. When the supply head 44 is filled (with the press plunger 43 retracted), the press plunger can execute a working stroke, whereby plastic is extruded. When the press plunger ceases to move forward (upward in FIG. 6), the supply of plastic to the nozzle opening 10 is interrupted.

We claim:
1. An apparatus for manufacturing a hollow body of thermoplastic material, said body has a formed head piece and a body member formed by blow-molding a tube segment attached to and integral with the head piece, comprising:
   a ring-shaped nozzle with a ring shaped nozzle opening bounded by a nozzle piece and a controllably, reciprocally movable nozzle cone piece;
   a withdrawal device operaive with respect to said ring-shaped nozzle, said withdrawal device is axially, reciprocally movable and has a recess for said head piece;
   a blow mold with a plurality of blow mold parts which are laterally reciprocally movable, wherein, when the blow mold is closed, its support surface on bottom members rests on a seat surface on said nozzle piece, and said closed blow mold leaves said nozzle opening free; and
   a blowing device which blows the extended withdrawn tube segment against the closed blow mold; whereby,
   the said closed blow mold leaves free said passage to said nozzle opening;
   a control device is provided for controlling the stretching of said extruded tube segment by means of said withdrawal device, under conditions of cessation of a feed of plastic;
   said nozzle opening is open until a start of said blowing process; and
   at said start of said blowing process, said nozzle opening is controlled such that said opening is closed by shear action, while said hollow body is under pressure, wherein as part of the shear action, a forward end member of the cone piece entirely passes between said bottom members of the closed blow mold.

2. An apparatus according to claim 1 wherein said region of said cone piece which interacts with said closing edge of said nozzle piece when said cone piece is forwardly advanced is a cylindrical segment.

3. An apparatus according to claim 2 wherein a conical segment of said cone piece is disposed forwardly of and merges with said cylindrical segment, said forward conical segment and said conical segment of said nozzle piece are at a same angle of inclination.

4. An apparatus according to claim 2 wherein said length of said cylindrical segment is approximately equal to said length of said excursion of said one piece between said open position and closed position.

5. An apparatus according to claim 2 wherein a device for advancing said plastic is provided, said device having a screw charging means and a compressing piston.

6. An apparatus according to claim 5 wherein said closed blow mold is separated from the nozzle opening by at least a small distance.

7. An apparatus according to claim 6 wherein said control means is adjusted to provide a gradual decrease of said feed of said plastic in relation to said withdrawal speed of said withdrawal device, or to provide a gradual increase of said withdrawal speed in relation to said feed of said plastic, during said stretching of said tube segment.

8. An apparatus according to claim 6 wherein a valve passing said blowing air and a valve closing off said nozzle opening by shear action are actuated simultaneously.

* * * * *